(12) United States Patent
Bugarcic et al.

(10) Patent No.: US 12,122,447 B2
(45) Date of Patent: Oct. 22, 2024

(54) VEHICLE HAVING A STEERING WHEEL ARRANGEMENT

(71) Applicant: MERCEDES-BENZ GROUP AG, Stuttgart (DE)

(72) Inventors: Dejan Bugarcic, Weinstadt (DE); Eric Gärtner, Horb (DE); Robert Kurbasic, Herrenberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/288,589

(22) PCT Filed: Mar. 25, 2022

(86) PCT No.: PCT/EP2022/058002
§ 371 (c)(1),
(2) Date: Oct. 27, 2023

(87) PCT Pub. No.: WO2022/228795
PCT Pub. Date: Nov. 3, 2022

(65) Prior Publication Data
US 2024/0217577 A1    Jul. 4, 2024

(30) Foreign Application Priority Data
Apr. 30, 2021 (DE) .................. 10 2021 002 297.1

(51) Int. Cl.
*B62D 1/19*     (2006.01)
*B62D 1/04*     (2006.01)
*B62D 1/183*    (2006.01)

(52) U.S. Cl.
CPC ............. *B62D 1/197* (2013.01); *B62D 1/046* (2013.01); *B62D 1/183* (2013.01)

(58) Field of Classification Search
CPC ......... B62D 1/197; B62D 1/046; B62D 1/183
See application file for complete search history.

(56) References Cited

U.S. PATENT DOCUMENTS 3,521,724 A * 7/1970 Gustav .................. B62D 1/197
                                                    180/274
4,365,825 A * 12/1982 Merkle ................. B62D 1/197
                                                    180/274
(Continued)

FOREIGN PATENT DOCUMENTS

CN      111699112 A     9/2020
CN      111727146 A     9/2020
(Continued)

OTHER PUBLICATIONS

International Search Report and Written Opinion mailed Aug. 19, 2022 in related/corresponding DE Application No. PCT/EP2022/058002.

(Continued)

*Primary Examiner* — Frank B Vanaman
(74) *Attorney, Agent, or Firm* — PATENT PORTFOLIO BUILDERS PLLC

(57) ABSTRACT

A vehicle has a steering wheel arrangement that includes a control unit and a steering wheel, which is arranged on a steering column, connected to the control unit, and able to be positioned from a steering position into a safety position.

(Continued)

Figure 1:
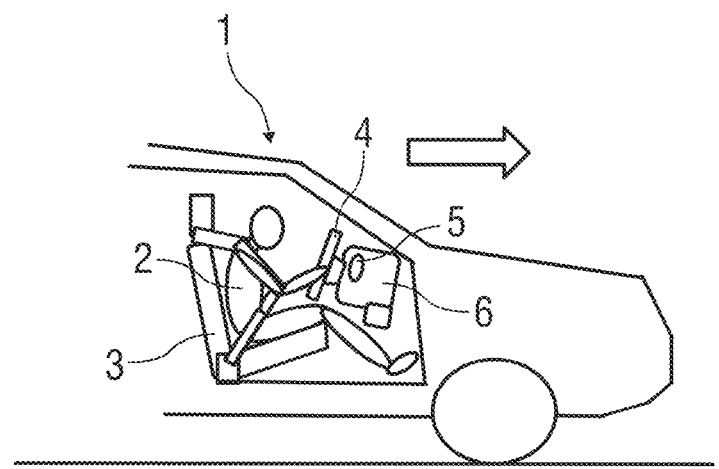

The steering wheel arrangement also includes an adjustment unit connected to the control unit at least for positioning the steering wheel arranged on the steering column from the steering position into the safety position, and the steering wheel arrangement is designed to vibrate on positioning from a steering position into the safety position.

7 Claims, 5 Drawing Sheets

(56) References Cited

U.S. PATENT DOCUMENTS

| | | | | |
|---|---|---|---|---|
| 5,174,409 | A | * 12/1992 | Osawa | B60R 22/1953 |
| | | | | 180/274 |
| 5,209,512 | A | * 5/1993 | Hancock | B62D 1/197 |
| | | | | 280/775 |
| 6,070,686 | A | * 6/2000 | Pollmann | B60R 25/0224 |
| | | | | 180/287 |
| 9,884,641 | B2 | 2/2018 | Mitobe et al. | |
| 11,142,235 | B2 | 10/2021 | Watanabe et al. | |
| 2016/0121917 | A1 | * 5/2016 | Bonfante, Jr. | B62D 1/04 |
| | | | | 74/473.2 |
| 2017/0008475 | A1 | * 1/2017 | Kruse | B62D 1/18 |
| 2021/0061208 | A1 | 3/2021 | Horvath | |
| 2021/0070348 | A1 | 3/2021 | Schmidt | |

FOREIGN PATENT DOCUMENTS

| | | | |
|---|---|---|---|
| DE | 19860804 A1 | 7/2000 | |
| DE | 102005055743 A1 | 5/2007 | |
| DE | 102018200436 A1 | 7/2019 | |
| EP | 3710334 B1 * | 10/2021 | ............ B62D 1/183 |
| JP | H11255045 A | 9/1999 | |
| JP | 2008213563 A | 9/2008 | |
| JP | 2017007594 A | 1/2017 | |
| JP | 2021020583 A | 2/2021 | |
| WO | 2015011866 A1 | 1/2015 | |

OTHER PUBLICATIONS

Office Action created Jun. 28, 2021 in related/corresponding DE Application No. 10 2021 002 297.1.
Office Action dated May 13, 2024 in related/corresponding CN Application No. 2022800316261.
Office Action dated May 7, 2024 in related/corresponding JP Application No. 2023566646.

* cited by examiner

VEHICLE HAVING A STEERING WHEEL ARRANGEMENT

BACKGROUND AND SUMMARY OF THE INVENTION

Exemplary embodiments of the invention relate to a vehicle having a steering wheel arrangement, comprising a control unit and a steering wheel which is arranged on a steering column, connected to the control unit and able to be positioned from a steering position into a safety position.

DE 198 60 804 A1 discloses an arrangement of a driver airbag in a motor vehicle having a dashboard and a steering wheel. At least one folded driver airbag is installed in the dashboard and can be filled by means of a gas generator and can unfold in front of the driver via an airbag exit opening in the dashboard.

Exemplary embodiments of the invention are directed to specify a vehicle having a steering wheel arrangement.

A vehicle has a steering wheel arrangement comprising a control unit and a steering wheel arranged on a steering column, connected to the control unit, and able to be positioned from a steering position into a safety position. According to the invention, the steering wheel arrangement comprises an adjustment unit connected to the control unit at least for positioning the steering wheel arranged on the steering column from the steering position into the safety position. In addition, the steering wheel arrangement is designed to vibrate when it is positioned from the steering position into the safety position.

By means of vibration of the steering wheel arrangement, in particular of the steering wheel, when positioning the same from the steering position into the safety position, a vehicle user, in particular a driver of the vehicle is alerted to release their hands from the steering wheel. It can thus be substantially avoided that, if the vehicle user is holding the steering wheel with their hands, they are pulled in the direction of an instrument panel when the steering wheel is positioned into the safety position.

In an embodiment, the control unit is designed to activate the adjustment unit for positioning the steering wheel from the steering position into the safety position when an automated driving operation is activated and/or immediately before a driver airbag is triggered.

If the steering wheel is positioned into the safety position due to the activation of the automated driving operation, the steering wheel no longer protrudes into a passenger compartment, such that a larger freedom of movement is created for the vehicle user.

If the steering wheel is positioned into the safety position due to an imminent collision of the vehicle, the driver airbag assigned to the vehicle user can unfold substantially unhindered to take up its active position. A protective effect of the driver airbag can thus be optimized for the vehicle user.

Via the vibration of the steering wheel, it can be ensured that in the event of an accident or shortly before an accident occurs, the vehicle user releases their hands from the steering wheel, as a grip of the vehicle user is insufficient to keep the steering wheel in the steering position. For example, the vibration can be implemented in a pulsating manner.

In an embodiment, the adjustment unit comprises a pulling element coupled with an electric motor, such that the steering wheel adjustment unit is designed reversibly. The steering wheel can thus be positioned into the safety position and back into the steering position several times without a function of the adjustment unit being impaired.

In an alternative or additional embodiment, the adjustment unit comprises a pulling element coupled with a pyrotechnic gas generator. If the pyrotechnic gas generator is triggered, a pulling force acts on the pulling element, in particular in the form of a cord, such that the steering wheel can be positioned from the steering position into the safety position. For example, this embodiment is selected if it is determined that a collision of the vehicle is imminent, and it is required to position the steering wheel into the safety position within a very short period of time before the driver airbag is triggered. An unhindered unfolding of the driver airbag is thus substantially ensured.

A development of the steering wheel arrangement provides that a baffle and/or a mechanical guide of the steering column relative to an outer tube are or is designed to generate the vibration of the steering wheel arrangement, in particular of the steering wheel, when positioning the steering wheel from the steering position into the safety position. It is thus not required to arrange a separate function element to generate the vibration. In addition, it is not required to correspondingly lay cables both to transmit a control signal and to supply the function element with electrical energy.

In particular, in a possible development, baffle elements for generating the vibration are arranged and/or molded on the steering column and/or on the outer tube. The baffle elements can be designed as a toothing between the steering column and the outer tube, such that the steering column is guided with its toothing along the toothing of the outer tube when the steering wheel is positioned in the safety position, whereby the steering wheel vibrates.

As an alternative or in addition, in a further embodiment, a vibration motor coupled with the steering wheel and/or with the steering column is designed to generate the vibration of the steering wheel arrangement, in particular of the steering wheel, when the steering wheel is positioned from the steering position into the safety position. It is thus possible, for example, to use a vibration motor that is already present if the vehicle has a lane departure warning system, the steering wheel vibrating by means of the vibration motor when it is positioned from the steering position into the safety position, such that the vehicle user releases their hands from the steering wheel.

In a further embodiment, to enable the steering wheel to be positioned in the safety position immediately before the driver airbag is triggered, the control unit is coupled with a collision sensor. If it is determined by means of the collision sensor that a collision of the vehicle is immediately imminent, the collision sensor continuously transmits a corresponding signal to the control unit to position the steering wheel in the safety position and such that the steering wheel vibrates when it is positioned.

In an alternative or additional embodiment, the control unit is coupled with an assistance system for the automated driving operation, such that the control unit generates a control signal when the assistance system is activated and the adjustment unit is correspondingly actuated to position the steering wheel from the steering position into the safety position.

Exemplary embodiments of the invention are explained in more detail in the following with reference to the drawings.

BRIEF DESCRIPTION OF THE DRAWING FIGURES

Figure 2:
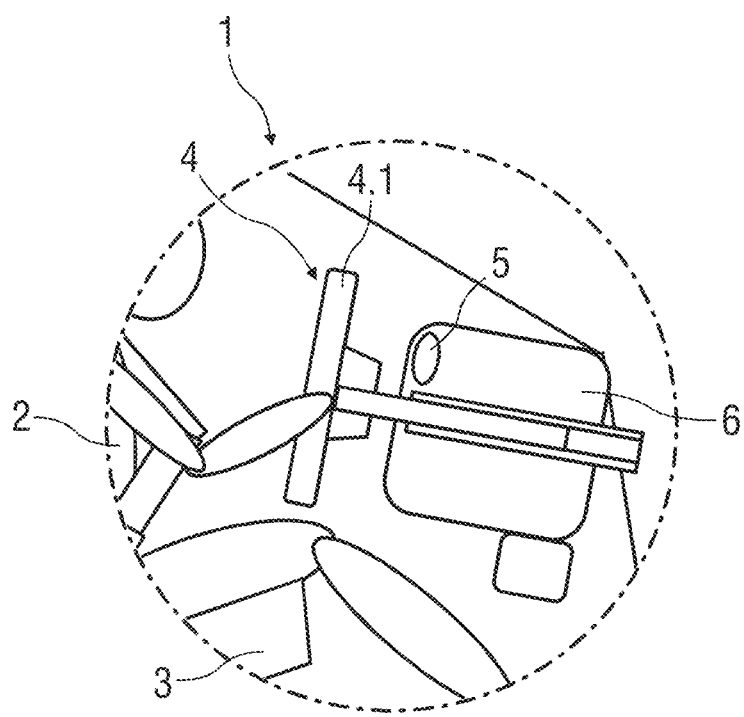
Figure 3:
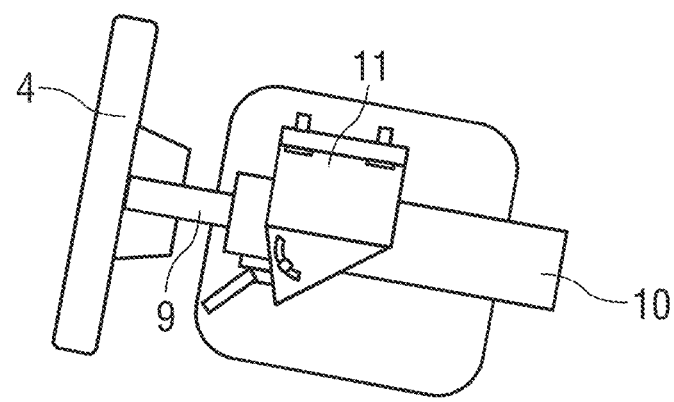
Figure 4:
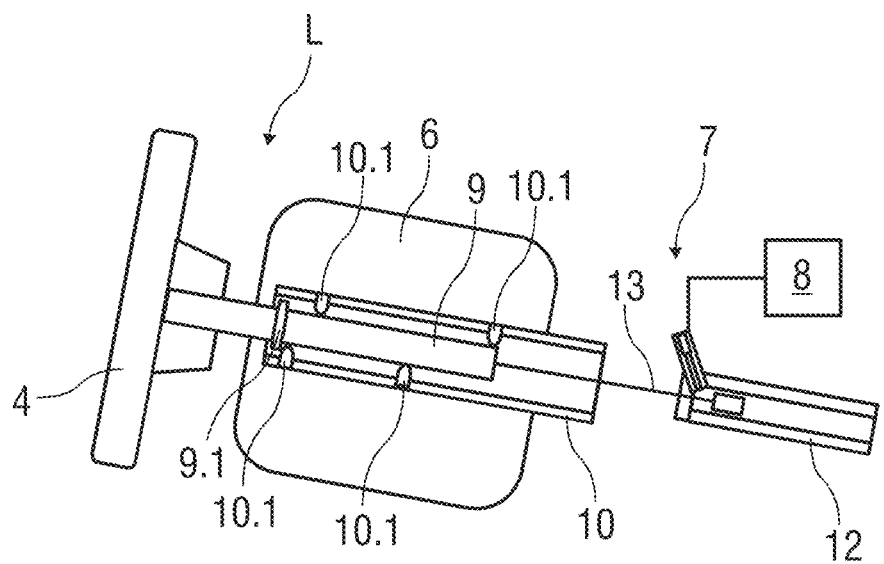
Figure 5:
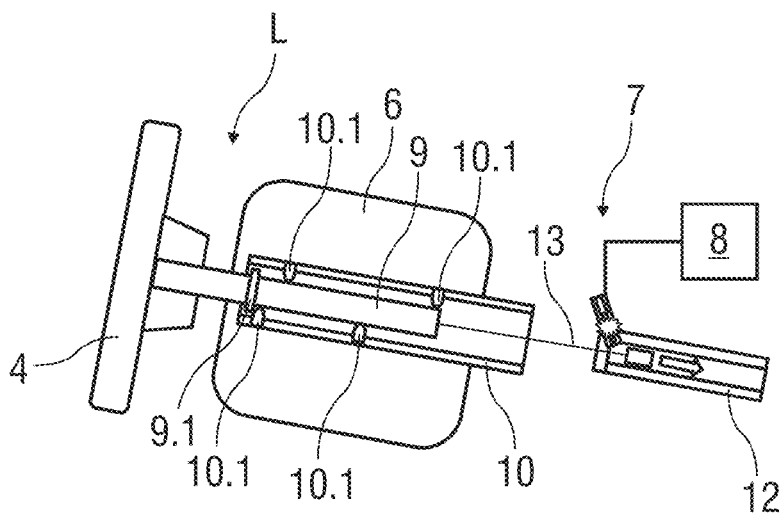
Figure 6:
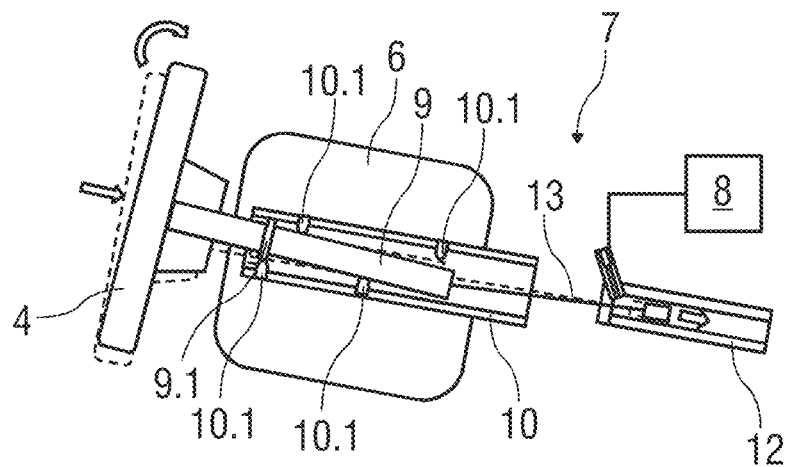
Figure 7:
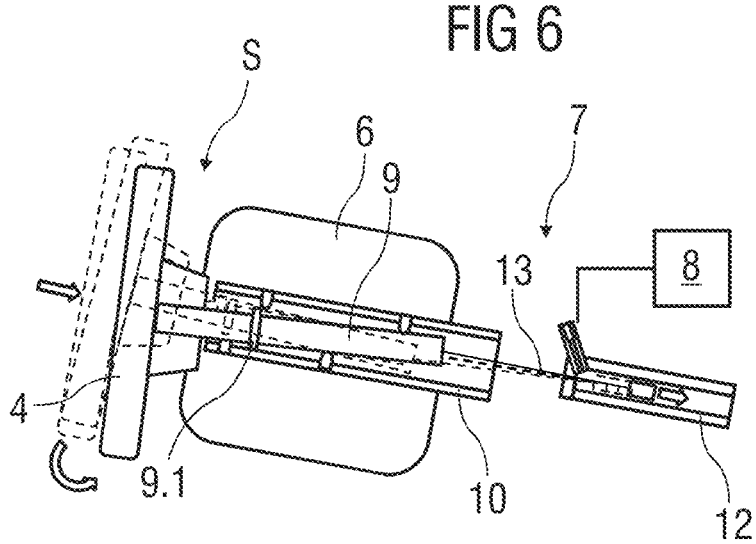
Figure 8:
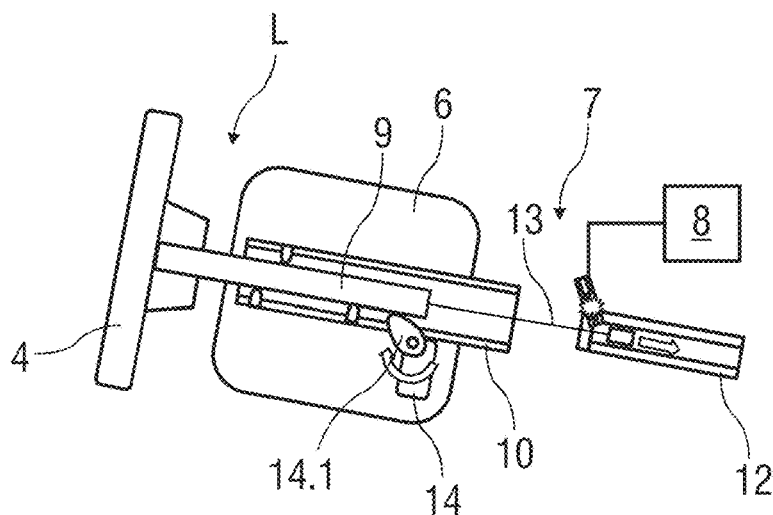
Figure 9:
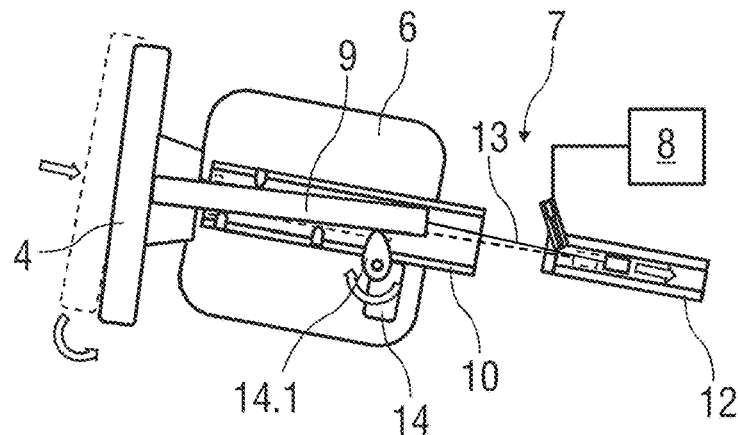
Figure 10:
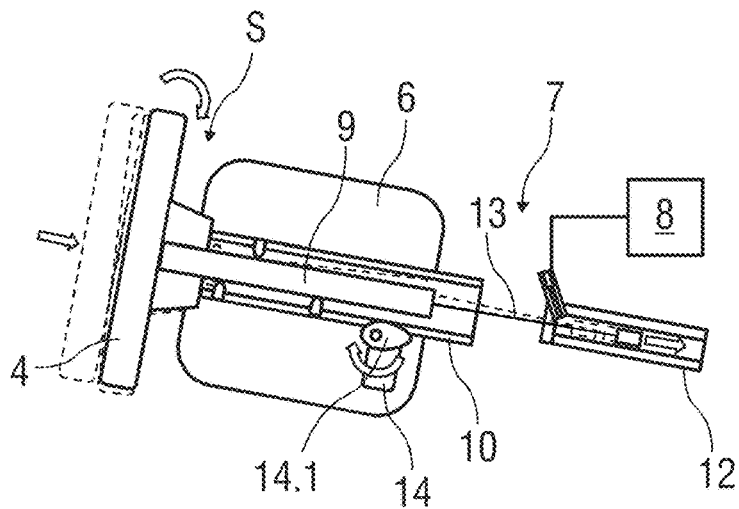
Figure 11:
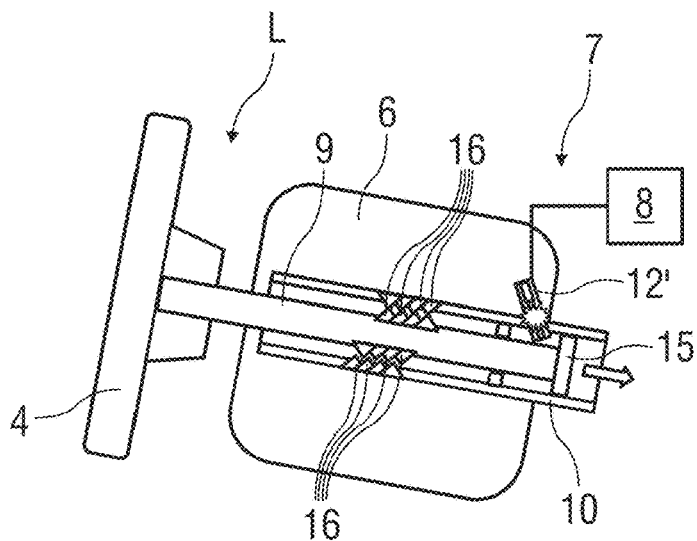
Figure 12:
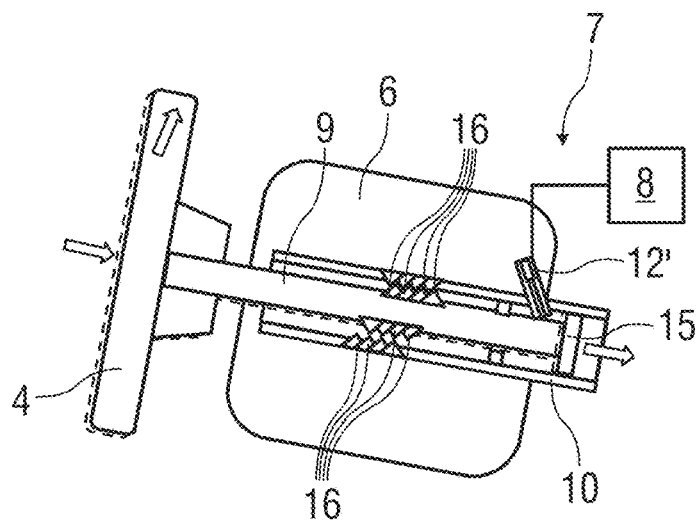
Figure 13:
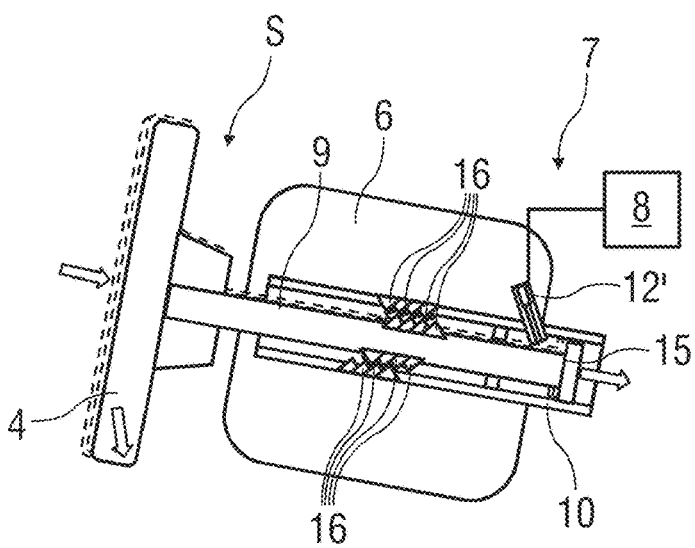

In the figures:

FIG. 1 schematically shows a section of a vehicle with a vehicle user on a vehicle seat, FIG. 2 schematically shows an enlarged section of the vehicle with the vehicle user who is holding a steering wheel of the vehicle, FIG. 3 schematically shows a steering wheel arrangement having an adjustment device, FIG. 4 schematically shows a sectional depiction of the steering wheel arrangement having a pyrotechnic gas generator and the steering wheel in a steering position, FIG. 5 schematically shows a sectional depiction of the steering wheel arrangement having the pyrotechnic gas generator when it is triggered, FIG. 6 schematically shows a sectional depiction of the steering wheel arrangement when the vibrating steering wheel is positioned in a safety position, FIG. 7 schematically shows a sectional depiction of the steering wheel arrangement having the vibrating steering wheel when it takes up the safety position, FIG. 8 schematically shows a sectional depiction of a first further embodiment of the steering wheel arrangement having the steering wheel in the steering position, FIG. 9 schematically shows a sectional depiction of the first further embodiment of the steering wheel arrangement having a vibrating steering wheel when it is positioned in the safety position, FIG. 10 schematically shows a sectional depiction of the first further embodiment of the steering wheel arrangement having the vibrating steering wheel when it takes up the safety position, FIG. 11 schematically shows a sectional depiction of a second further embodiment of the steering wheel arrangement having the steering wheel in the steering position, FIG. 12 schematically shows a sectional depiction of the second further embodiment of the steering wheel arrangement having a vibrating steering wheel when it is positioned in the safety position, and FIG. 13 schematically shows a sectional depiction of the second further embodiment of the steering wheel arrangement having the vibrating steering wheel when it takes up the safety position.

Parts corresponding to one another are provided with the same reference numerals in all figures.

DETAILED DESCRIPTION

FIG. 1 shows a section of a vehicle 1 with a vehicle user 2 on a vehicle seat 3. In FIG. 2, an enlarged section of a vehicle 1 with the vehicle user 2 on the vehicle seat 3 is depicted. The vehicle 1 is in the manual driving operation and the vehicle user 2 holds a steering wheel 4 of the vehicle 1 in their hands to carry out steering movements.

It is generally known that a driver airbag 5 assigned to the vehicle user 2 and depicted in FIGS. 1 and 2 in a significantly simplified manner is integrated into the steering wheel 4, in particular a steering wheel cap. The driver airbag 5 thus unfolds out of the center of the steering wheel 4, wherein an airbag cover (not depicted in more detail) tears open and an airbag exit opening of a housing (also not depicted in more detail) is released due to a dynamic unfolding of the driver airbag 5. The driver airbag 5 unfolds out of this airbag exit opening and takes up its active position. The driver airbag 5 is usually at least partially supported on a steering wheel rim 4.1 to generate a restraining force.

As an alternative, the driver airbag 5 can also be integrated into an instrument panel 6 of the vehicle 1, from which the driver airbag 5 unfolds. The driver airbag 5 unfolds over the steering wheel 4. According to the exemplary embodiment shown in FIGS. 1 and 2, the driver airbag 5 is integrated into the instrument panel 6.

As another alternative, the driver airbag 5 can be arranged on an underside of the instrument panel 6 and/or in a periphery, e.g., in a roof region and/or an inner cladding of the vehicle 1.

Such an airbag system comprising the driver airbag 5 is generally arranged such that the vehicle user 2 with a body positioning for a manual driving operation is protected to the greatest possible extent in the event of a collision of the vehicle 1 by means of the driver airbag 5 in its active position.

It is further generally known that vehicles 1 have an assistance system for the automated driving operation of the vehicle 1. The vehicle user 2 essentially completely gives their driving role over to the vehicle 1, i.e., the assistance system, such that the vehicle user 2 can take up another sitting position and take up another activity.

If the vehicle user 2 has another seating position, for example in the direction of a passenger seat (not depicted), the risk arises that the driver airbag 5 in its active position only offers limited protection against injury for the vehicle user 2 in the event of a collision, because e.g., a spacing between the vehicle user 2 and the driver airbag 5 is too large.

In the following, different embodiments of a steering wheel arrangement are described, which comprises an adjustment unit 7 and a control unit 8, and is designed to position the steering wheel 4 from a steering position L shown in FIGS. 3 to 5, 8 and 11 into a safety position S shown in FIGS. 7, 10 and 13 when the automated driving operation of the vehicle 1 is activated and/or immediately before the driver airbag 5 is triggered. In addition, the steering arrangement is designed to vibrate when the steering wheel 4 is positioned from the steering position L into the safety position S.

In the steering position L, the steering wheel 4 is positioned in relation to the vehicle user 2, such that the latter can grip the steering wheel 4 comparatively comfortably to carry out steering movements.

In the safety position S, the steering wheel 4 is positioned such that the latter is arranged comparatively close to the instrument panel 6 or in the instrument panel 6. The driver airbag 5 integrated into the instrument panel 6 can thus unfold over the steering wheel 4, wherein the steering wheel 4 does not represent a hindrance for the unfolding driver airbag 5.

FIG. 3 shows the steering arrangement having the steering wheel 4, a steering column 9, to which the steering wheel 4 is fixed, an outer tube 10 in which the steering column 9 runs sectionally, and an adjustment device 11. By means of the adjustment device 11, an adjustment of the steering wheel 4 in the direction of the course of the steering column 9 and of the outer tube 10 and an adjustment of an angle of the steering wheel 4 relative to the vehicle user 2 is possible.

FIGS. 4 to 7 show an embodiment of the steering wheel arrangement having the adjustment unit 7 for positioning the steering wheel 4 from the steering position L into the safety position S.

In this embodiment, the adjustment unit 7 comprises a pyrotechnic gas generator 12 and a pulling element 13 in the form of a cord. An end of the pulling element 13 is connected to the steering column 9 and an opposite end is connected to the gas generator 12.

If, in particular using signals recorded by a collision sensor of the vehicle 1, it is determined that the vehicle 1 is about to have a collision that exceeds a pre-determined threshold value of a predicted collision severity, a corresponding signal is transmitted to the control unit 8 which is coupled with the adjustment unit 7.

By means of a signal of the control unit 8 that is then generated, the adjustment unit 7 is activated immediately before the driver airbag 5 is triggered, such that the steering column 9 is pulled in with the steering wheel 4.

According to the exemplary embodiment shown in FIGS. 4 to 7, the adjustment unit 7 is designed irreversibly.

The gas generator 12 is ignited due to the signal of the control unit 8, whereby a pulling force acts on the pulling element 13 and the steering wheel 4 takes up its safety position S. The steering wheel 4 is thus accelerated away from the vehicle user 2.

To generate the vibration of the steering arrangement when positioning the steering wheel 4 in the safety position S, the steering column 9 has a guide element 9.1 that is annular in shape. Baffle elements 10.1 are designed on an inner surface of the outer tube 10, the baffle elements 10.1 protruding into a cavity of the outer tube 10.

If the steering column 9 is pulled into the outer tube 10 due to the pulling force acting on the pulling element 13, the guide element 9.1 glides along the baffle elements 10.1. The steering column 9 having the steering wheel 4 fixed to the latter thus vibrates on positioning from the steering position L into the safety position S. The vibration while being pulled in is depicted in FIGS. 6 and 7 by means of a dashed line.

In addition, or as an alternative to the gas generator 12, an electric motor can be provided to reversibly position the steering wheel 4 from the steering position L into the safety position S. The electric motor is, in particular, designed as a linear motor and the opposite end of the pulling element 13 is connected to the electric motor. If the electric motor is activated, the latter generates the pulling force acting on the pulling element 13 for pulling the steering column 9 into the outer tube 10.

FIGS. 8 to 10 show a first further embodiment of the steering wheel arrangement, wherein the positioning of the steering column 9 with the steering wheel 4 is also implemented by means of the gas generator 12 and of the pulling element 13.

In the first further embodiment, a vibration motor 14, in particular an electric motor cam 14.1, is provided which generates the vibration of the steering wheel 4. For this purpose, the vibration motor 14, in particular its cam 14.1, is coupled with the steering column 9. If the vibration motor 14 is activated due to the signal of the control unit 8, the cam 14.1 rotates, whereby the steering column 9 and the steering wheel 4 arranged on the latter vibrates. In particular, the steering column 9 is raised and lowered by means of the cam 14.1 designed in such a manner, thereby resulting in the vibration. Here too, the vibration of the steering column 9 and of the steering wheel 4 is depicted by means of a dashed line. This vibration motor 14 can for example be a component of a lane departure warning system of the vehicle 1 and be used for vibration of the steering wheel 4 when it is positioned from the steering position L into the safety position S.

For example, the vibration motor 14 can be activated to generate a haptic warning before the positioning of the steering wheel 4 takes place.

A second further embodiment of the steering wheel arrangement is depicted in FIGS. 11 to 13.

In the second further embodiment, a gas generator 12' connected to the control unit 8 by signaling technology is integrated into the outer tube 10.

A seal element 15 is arranged on a free end of the steering column 9, such that the outer tube 10 is designed as a pressure chamber in the region of the steering column 9. The gas generator 12' is arranged within this pressure chamber.

If the signal of the control unit 8 is fed to the gas generator 12', the latter is ignited, whereby a gas is released and a pressure in the pressure chamber is increased. Via the increase of pressure, which acts on the seal element 15 and thus on the steering column 9, the steering column 9 is positioned from the steering position L into the safety position S with the steering wheel 4.

To generate the vibration when positioning the steering wheel 4, an interlocking toothing is provided in the second further embodiment. For this purpose, tooth elements 16 that interlock in the steering position L are arranged or molded in a pre-determined region of the steering column 9 and in a pre-determined region of an inner surface of the outer tube 10.

If the steering column 9 is pulled in with the steering wheel 4, the tooth elements 16 of the steering column 9 glide along the tooth elements 16 of the outer tube 10, such that the steering column 9 and the steering wheel 4 vibrate, as is illustrated by means of the dashed line.

In alternative embodiments, a spiral-shaped and or sawtooth-shaped guide with molded baffle elements 10.1 can be provided.

As described above, the positioning of the steering wheel 4 from the steering position L into the safety position S can be implemented by means of pyrotechnic gas generators 12, 12', but also by electric motor, electromagnetically, pneumatically and/or hydraulically.

It is also conceivable that a gas pressure required for the positioning is made available via a bypass from an airbag, for example a knee airbag, as a component of the adjustment unit 7.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle, comprising:
    a steering wheel arrangement, which comprises
        a control unit;
        a steering wheel arranged on a steering column, connected to the control unit, and positionable from a steering position into a safety position;
        an adjustment unit connected to the control unit and configured at least to position the steering wheel arranged on the steering column from the steering position into the safety position, wherein the steering wheel arrangement is configured to vibrate when the steering wheel is positioned from the steering position into the safety position, wherein a baffle or a mechanical guide of the steering column relative to an outer tube is configured to generate a vibration to vibrate the steering wheel when positioning the steering wheel from the steering position into the safety position.

2. The vehicle of claim 1, wherein the control unit is configured to activate the adjustment unit to position the steering wheel from the steering position into the safety position when an automated driving operation is activated or immediately before a driver airbag is triggered.

3. The vehicle of claim 1, wherein the adjustment unit comprises a pulling element coupled with an electric motor.

4. The vehicle of claim 1, wherein the adjustment unit comprises a pulling element coupled with a pyrotechnic gas generator.

5. The vehicle of claim 1, wherein the baffle includes baffle elements configured to generate the vibration, wherein the baffle elements are arranged on or molded on the steering column or is arranged on or molded on the outer tube.

6. The vehicle of claim 1, wherein the control unit is coupled with a collision sensor.

7. The vehicle of claim 1, wherein the control unit is coupled with an assistance system configured for automated driving operation.

\* \* \* \* \*